June 23, 1964  J. F. WERNETT  3,137,959
TRIPLE-UNIT ANIMATED LURE
Filed Jan. 17, 1963
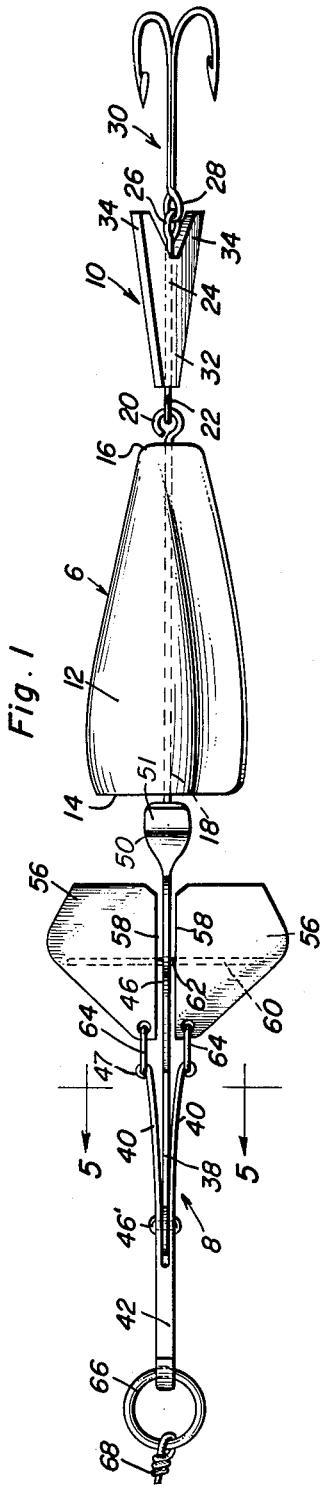
Fig. 1
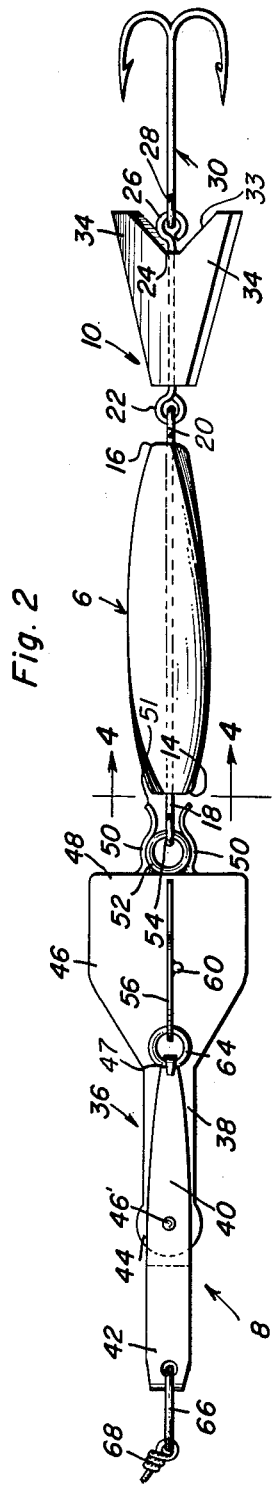
Fig. 2
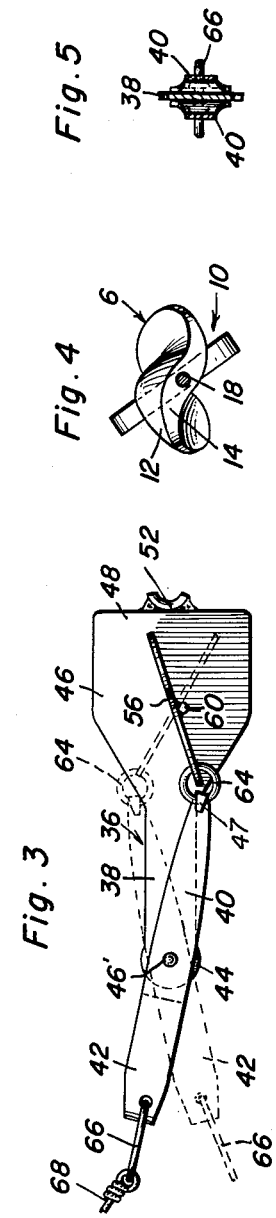
Fig. 5
Fig. 4
Fig. 3
John F. Wernett
INVENTOR.
BY
Attorneys United States Patent Office 3,137,959
Patented June 23, 1964

3,137,959
TRIPLE-UNIT ANIMATED LURE
John F. Wernett, 22107 Clarendon St.,
Woodland Hills, Calif.
Filed Jan. 17, 1963, Ser. No. 252,186
4 Claims. (Cl. 43—42.13)

The present invention relates to an animated fishing lure characterized by three units or sections, more particularly, a freely rotatable body section, a tail section linked to the rear or trailing end of the body section, and a head section linked to the forward end and to which a trolling line is connected.

A three-part fishing lure embodying the aforementioned generally described component parts is not new. A number of prior patents answering the above description, some quite recent, have been issued, for example, a patent to Ogburn 2,662,330 of December 15, 1953, and, more significantly, a patent to Cherry 2,940,205 of June 14, 1960. The latter patent is being used here as typical of the state of development of the art to which the instant invention relates in that it embodies not only body, tail and head sections which are linked for trolling through the water but, in addition, a bladed body section which, being rotatable on a shaft provided therefor, constitutes a spinner.

An object of the present invention is to improve upon known prior animated triple-part lures in a number of ways. To the ends desired the leading or head section in the present adaptation is unique in that it is characterized by interrelated relatively movable component parts, more particularly, adjustable vanes or stabilizers which, after the user familiarizes himself therewith and their operation, may be effectively employed to not only guide the forward traveling motion of the overall lure but to maneuver it so that it may be caused to dart "down" and submerge or "up" to ascend in keeping with the intention and desire of the user.

In carrying out a preferred embodiment of the invention a simple elongated body which is transversely twisted and generally S-shaped in cross-section is mounted for free rotation on a supporting shaft provided therefor. A shorter shaft is linked by connecting eyes to the rear end thereof and this short shaft has a blade fixed thereon the rear end of the blade being V-shaped to define tail fins. The forward end of the first-named shaft is connected by an eye to another eye which is provided therefor on the rearward or trailing end of the head section thus providing a linking connection which limits the vertical or up and down movement of the body but nevertheless permits said body to swing from side to side, that is, left or right of the forward line of draft.

As will be hereinafter more fully appreciated the instant invention features an unusually novel head unit or section which is an innovation in that it is characterized by a simple elongated bar or equivalent member having its rearward end bifurcated, the furcations cooperating in defining a fork. These furcations or fingers function to support a portion of a vertical vane or stabilizer which is pivoted therebetween and whose rearward end is provided with left and right auxiliary vanes or stabilizers, the several stabilizers being operatively interconnected and related to enable the user to maneuver the overall lure to in this manner attain effective results.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a top plan view of an animated lure constructed in accordance with the present invention and showing how it is constructed and with the several companion sections or units lined up in the manner in which they would be related when drawn through the water;

FIGURE 2 is a view in side elevation of the same;

FIGURE 3 is a side elevational view showing only the forward or head section and wherein, with the aid of full and phantom lines, relatively movable positions of the vertical and horizontal stabilizers are designated; and FIGURES 4 and 5 are sections taken on the plane of the section lines 4—4 and 5—5 of FIGURES 2 and 1, respectively.

With reference in particular to FIGURES 1 and 2 the body section is denoted by the numeral 6, the head section by the numeral 8 and the tail section by the numeral 10.

More specifically, the body section comprises an elongated one-piece spinner which is generally S-shaped in transverse section as denoted at 12 in FIG. 4 and which may, if desired, be gradually decreased in cross-sectional width from the forward substantially straight across end 14 to the narrower straight across rearward end 16. This body is mounted for free rotation on an elongated supporting shaft 18 which is provided at its rearward end with an eye 20 projecting beyond the body end 16 and which is connected with a similar eye 22 on the forward end of a shorter shaft 24 terminating at its rearward end in an eye 26 to which the forward end 28 of the triple prong fishhook 30 is connected. The twisted or S-shaped body 6 is freely rotatable on the shaft 18 and consequently constitutes a free turning spinner. The shaft 24 supports and carries a truncated triangulate plate or blade 32 the central axial portion of which is pierced by the shaft 24 and is fixedly joined thereto. The wider rearward end portion is provided with a centralized V-shaped notch or kerf 33 defining tail fins 34. The hook 30 has limited relative swinging movement in respect to the tail section 10 and the tail section 10, which carries this hook, has comparatively free swinging movement as a result of the linking eyes 20 and 22 which is sufficient to give the hook means 30 the play thought to be necessary to land the prey.

Whereas the tail section 10 comprises merely a shaft with a fixed tail-shaped member thereon and the body section 6 is characterized chiefly by an elongated spiralling blade or member on a shaft with the two shafts linked together, the head section 8 is radically and structurally different from the sections 6 and 10. It is such in construction that it functions to drag the sections 6 and 10 through the water with the section 6 spinning or turning to attract attention, and the tail section 10 swinging up and down and from side to side in a manner to attract attention of the potential victim. The head section when handled by an experienced fisherman and consequently aptly trolled, achieves the maneuverability desired in making the most of the spinning body and switching tail section. Experience has shown that the head unit illustrated is not only adaptable to serve its intended purposes, it lends itself to reliable cooperative use in conjunction with the body and tail sections 6 and 10. To the ends desired a paddle-shaped plate or member 36 is employed. This plate comprises a narrow forward shank portion 38 which is located between the fork fingers or furcations 40 of the bifurcated rearward end of the bar member 42. Actually the leading end 44 which is disk-like is pivoted on a horizontal pivot 46' between the fork fingers. The blade proper 46 is widened and located beyond the terminal eye-equipped ends 47 of the fork fingers 40. The rearward edge 48 is provided with a pair of upper and lower spaced prongs 50 which have an eye or ring 52 welded or otherwise fixed therebetween, thus providing a coupling member for the coacting eye 54 on the body carrying shaft 18. This paddle-like member 36 may be distinguished as the main vane or stabilizer blade. The blade portion 46 is augmented in operation by the addition thereto of left and right auxiliary horizontal vanes or stabilizers 56 which are of the outline or shape shown in plan in FIG. 1 and which are duplicates of each other and are arranged with their straight edged inner marginal portions 58 on opposite sides of the main vane. The median portions of the vanes 56 are fixed on outstanding end portions 60 of a rock-shaft 62 which is rockably mounted in bearing means provided therefor in the median portion of the main stabilizer blade 46. Thus these several stabilizers coordinate in providing a satisfactory head maneuvering or control unit. It will be also noted that the forward end portions are provided with linking rings 64 connected with hinging eyes 47 whereby to mechanically interconnect the essential component parts, the forked bar 42 and main and auxiliary stabilizing vanes 36 and 56. The forward end of the bar member 42 is provided with a ring or the like 66 to which a trolling line 68 is connected in the manner illustrated.

Experience with the lure has shown that the novelly constructed head section 8 with its accompanying vanes or stabilizers makes it possible for the fisherman to satisfactorily use the overall lure for effective deep down trolling requirements. When the lure is deposited or cast in the water the trolling line is pulled upon either by hand or by the boat to which it is connected. By pulling the line in an upward direction (as illustrated in FIG. 3) the flap-like vanes or stabilizers 56 can be tilted downwardly and forwardly relative to the intervening auxiliary stabilizing approximately vertical stabilizer 46. This results in downwardly casting the lure so that it will ride deep down into the water as it is pulled or trolled forwardly. Experience has also shown that regardless of which side of the lure lands in the water the flap-like vanes or stabilizers 56 flap down. The extensions or prongs 50 on the rearward end in conjunction with the interconnected links 52 and 54 and shaft 18 function to permit the spinner body 6 to not only spin but to switch laterally, that is from side to side in a generally horizontal plane. Up and down movement of the spinner body is limited by the fact that the rearward ends 51 of the prongs 50 extend beyond the attaching ring 52 and tend to restrain the up and down movement of the eye 54 (see FIG. 2).

As is evident the fact that the lure is characterized by the several sections or units 6, 8 and 10 with each part performing its function and contributing to the overall united function, it is difficult and perhaps unnecessary to attempt to visualize and describe the ever-changing relationship of the sections. On the other hand one can readily understand and appreciate that the movements of the sections produce the animation desired in attracting and catching fish.

It is submitted that a careful consideration of the specification in conjunction with the views of the drawing will enable the reader to obtain a full and comprehensive understanding of the construction of the component parts and the manner in which they cooperate to achieve advantageous results. Therefore, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lure comprising a head section embodying a bar member provided at a rear end with a fork having fingers and provided at its forward end with a trolling line, a main vane having a forward end portion pivotally mounted between the fingers of the fork, said main vane being provided on opposite sides thereof with complemental auxiliary vanes which are pivotally mounted on said main vane, and means linking the auxiliary vanes to rearward ends of the fingers of said fork, body and tail sections connected to each other, and means connecting a forward end of the body section to a rearward end of said main vane.

2. The structure defined in claim 1 and wherein said last means comprises rearwardly extending prongs having an attaching ring fixed therebetween, said body section having a shaft with an eye on a leading end thereof, and said ring adapted to accommodate said eye.

3. A fishing lure comprising a head section embodying a bar member provided at a forward end with a trolling line and provided at a rearward end with a pair of spaced fingers defining a fork, the rearward ends of said fingers being provided with hinging eyes, a stabilizer comprising a portion fitted and pivoted between the fingers and a main vane which projects beyond the terminal ends of said fingers, said main vane being adapted to assume a generally vertical plane when in use and being provided on opposite sides with like auxiliary vanes which are swingably mounted on said main vane and which are coplanar with each other but are at right angles to the plane of said main vane, rings linking forward ends of said auxiliary vanes to said hinging eyes, a body section, means connecting the forward end of the body section to the rearward end of said main vane, and a tail section, said tail section being hingedly connected at a forward end to a rearward end of the body section.

4. A fishing lure comprising a head section embodying a bar member having means at a forward end thereof for the attachment thereto of a trolling line, said bar member being provided at a rear end with a fork and said fork embodying opposed fingers, said fingers having rear terminal ends provided with hinging and linking eyes, stabilizing means comprising a main vane having a forward end portion interposed between the fork fingers and pivotally connected to forward end portions of said fingers, said main vane also having a blade portion occupying a position which is disposed rearwardly of said hinging eyes and being provided on the respective opposite sides thereof with auxiliary vanes, said auxiliary vanes being duplicates of each other and being pivotally mounted on a median portion of the intervening main vane and being disposed at right angles to said main vane and having forward ends provided with linking rings and said linking rings being hingedly joined to said hinging eyes, a fixed ring secured to a median rear edge portion of said main frame, a body section having a shaft with the forward end thereof connected to said fixed ring, and a hook-equipped tail section having means hingedly joining a forward end thereof to a rearward end of said body section.

References Cited in the file of this patent

UNITED STATES PATENTS

| 1,627,512 | Hughes et al. | May 3, 1927 |
| 2,294,971 | Fehringer et al. | Sept. 8, 1942 |
| 2,542,347 | Muller | Feb. 20, 1951 |
| 2,618,093 | Isaac | Nov. 18, 1952 |
| 2,622,362 | Jensen | Dec. 23, 1952 |
| 2,789,386 | Creelman | Apr. 23, 1957 |
| 2,895,253 | Hess | July 21, 1959 |

FOREIGN PATENTS

| 916,690 | France | Aug. 26, 1946 |
| 44,499 | Sweden | Sept. 4, 1918 |